United States Patent [19]
Bowker

[11] 3,767,307
[45] Oct. 23, 1973

[54] REAL TIME INTERFEROMETER
[75] Inventor: John Kent Bowker, Marblehead, Mass.
[73] Assignee: Itek Corporation, Lexington, Mass.
[22] Filed: Aug. 30, 1971
[21] Appl. No.: 178,522

[52] U.S. Cl. ................................................. 356/109
[51] Int. Cl. ............................................. G01b 9/02
[58] Field of Search ........................... 356/106, 109

[56] References Cited
UNITED STATES PATENTS
3,523,735  8/1970  Taylor................................. 350/106
3,435,656  4/1969  Jordan et al............................. 73/1
3,458,259  7/1969  Baglen et al......................... 356/106

OTHER PUBLICATIONS
"A Laser Unequal Path Interferometer for the Optical Shop," 6 Applied Optics 1237.

Primary Examiner—David Schonberg
Assistant Examiner—Conrad Clark
Attorney—Homer O. Blair et al.

[57] ABSTRACT

Disclosed is a laser unequal pathlength interferometer for measuring mirror surface figures. Test and reference beams of different wavelengths are used in conjunction with detection apparatus that is responsive to a beat frequency resulting from the combination of the test and reference beams. In a preferred embodiment a single beam is split to provide test and reference beams and a relative Doppler shift is imposed therebetween. An heterodyne circuit in the detection apparatus replaces the beat frequency with a stable carrier frequency before final analysis.

17 Claims, 6 Drawing Figures

John Kent Bowker
INVENTOR.
John E. Toupal
ATTORNEY.

John Kent Bowker
INVENTOR.

John E. Toupal
ATTORNEY

John Kent Bowker
INVENTOR.

John E. Taupal
ATTORNEY.

REAL TIME INTERFEROMETER

BACKGROUND OF THE INVENTION

This invention relates to interferometry, and more particularly, to apparatus for making real time interferometric measurements of mirror surfaces.

Laser unequal pathlength interferometers of modified Tyman Green configurations are commonly used for measuring the figures of mirror surfaces. Conventionally, the patterns produced by the interferring beams are focused on a ground glass viewing screen and viewed visually. If, however, highly accurate measurements of surface figure are required, a photograph is made of the resulting interference pattern. These photographs are then analyzed by photogrammetric techniques utilizing computers to produce the desired surface figure maps. Contemporary technology sometimes requires that the surface figures be known more rapidly as well as more accurately than is possible with photographic analysis. Consequently, a need for real time interferometry exists. The purpose of real time interferometry is to replace the typical procedure of first producing and subsequently analyzing a photographic interferogram, with a system that simultaneously examines and provides surface figure data for a test surface. With surface figure data immediately available, some regularly performed tests, such as are involved in the manufacturing of precision optical elements, can be performed more rapidly and conveniently. In addition, some heretofore impractical techniques such as immediate feedback control of active mirror systems become feasible.

Systems for achieving real time interferometry have been proposed. The best known of these analyzes beat frequency signal in an interference pattern resulting from two beams of light of different wavelengths one of which has been phase modulated by a test surface. While this method has been proven feasible, the resolution obtained has not been satisfactory for most applications. Most of the problems associated with prior systems of this type have stemmed from the methods employed to generate the two interferring beams of light. Generally, a source beam is split and one of the resulting beams is frequency shifted by apparatus such as a rotating quarter wave plate. Unfortunately, such apparatus creates substantial mechanical noise and turbulence that significantly reduce resolution. An alternative system employing separate light sources of different wavelengths is not sufficiently stable to be used with state of the art detectors. Stability is important because the detectors used are responsive to the beat frequency resulting from the combination of the two light beams. Even small perturbations in the original frequency of a generated light beam may be substantial with respect to the difference beat frequency that is being detected.

The object of this invention, therefore, is to provide an interferometer capable of measuring surface figures of mirrors in real time and with substantially improved resolutions in the order of 0.01 $\lambda$, where $\lambda$ is the wavelength of a light beam.

SUMMARY OF THE INVENTION

The invention is characterized by a real time optical interferometer with a radiation source that produces two beams of coherent monochromatic light of different wavelengths. One of these beams, denoted a test beam, is dispersed over the test surface that is to be measured. After reflections from the test surface, the test beam is combined with the other beam, denoted a reference beam, to provide optical interference in an output beam. Being of different wavelengths, or frequencies, the test and reference beam when combined exhibit a beat frequency to which a detection system in the path of the output beam is responsive. The detection system images the output beam onto an image surface so as to produce interference phenomena thereon that is in a geometric relationship to the test surface. A plurality of photosensitive detectors view different selective points on the image surface and are connected to a detector circuit that determines respective phase differences among the outputs of the detectors.

One featured embodiment of the invention utilizes a beam splitter to divide a laser beam into test and reference beams and a reciprocating retroreflector to produce a Doppler frequency shift in the reference beam. Dividing a single beam and imposing a Doppler shift upon one of the resultant beams renders the system substantially independent of source beam frequency and, therefore compatible with radiation sources of widely different frequency. The system also insures a sufficiently stable beat frequency. In any retroreflector system in which the retroreflector translates at a constant linear velocity, $v$, the frequency of the Doppler shifted beam $f_d$, expressed in terms of the original frequency $f$ is given by $f_d=f(2v/c)$ where $c$ is the velocity of light. A typical frequency of light is $5\times10^{14}$Hz, therefore, for moderate translations velocities, a typical beat frequency may be of the order of 5 to 100KHz.

Two featured embodiments of the reciprocating retroreflector comprises (1) a reciprocating cat's eye, and (2) a reciprocating corner cube. A characteristic of these devices that renders them desirable for this application is that an input beam of light properly striking a corner cube or a cat's eye is reflected as a beam slightly displaced from, but exactly parallel to the input beam path. Minor changes in orientation of the corner cube or cat's eye with respect to the beams of light do not affect the parallel relationship between beams. This property of corner cubes and cats' eyes is used in conjunction with a fixed mirror to both eliminate resideual angular errors in the retroreflector and to compensate for slight changes in its orientation during translation. The reference beam is directed to the reciprocating retroreflector, and is projected therefrom in a path parallel to the input path. A stationary mirror is disposed in the path of the reflected Doppler shifted reference beam and is adjusted so as to be perpendicular thereto. Therefore, the Doppler shifted beam simply reverses direction at the stationary mirror and returns through the retroreflector along its original path. Since the path of the reference beam on the first pass through the retroreflector is determined by the beam splitter, and the orientation of the return path through the retroreflector is controlled by the fixed mirror that returns the Doppler shifted beam thereto, residual angular errors are eliminated by appropriate alignment of the beam splitter and the return mirror on a common base. In this way superimposition of original and return beam paths is insured. In addition, since the reference beam passes through the retroreflector twice, the total Doppler frequency shift is twice that which would be generated by a single pass. A desired Doppler shift can be obtained, therefore, with a lower retroreflector velocity thereby simplifying the translation portion of the system.

Another feature of the invention is an optical diverger that expands the test beam so as to evenly illuminate a large test surface. The diverger also acts as a collimator for returning rays from the test surface. The test diverger facilitates testing of large curved surfaces. An output imaging system expands the output beam and images the test surface on the image surface. The resultant image of the test surface on the image surface accommodates a point to point correlation between the test surface and the image surface thereby simplifying data reduction. Expanding the output beam to cover a relatively large image surface provides a larger interference pattern that is easier to analyze.

Another feature of the invention is the inclusion of cross-over detectors and an associated bistable element, such as a flip flop in the detection circuit to determine phase relationship in the photosensitive detector outputs. The detectors are responsive to positive going crossovers in the output of the photosensitive detectors, and the outputs of the threshold detectors set and reset the bistable element. Therefore variations in the peak amplitudes of the detector outputs do not affect the detector circuit. An integrator averages the output of the flip-flop indicating the relative fraction over the period of the (1) state of the flip flop output. Therefore, the integrator output is directly proportional to the phase angle difference detected by the photosensitive detectors in a range from 0 to $2\pi$.

Still another feature of one prefered embodiment is an heterodyne circuit in the detection circuit that replaces the beat frequency sensed by the photosensitive detectors with a stable carrier frequency but maintains relative phase differences between the detector outputs. Therefore, time base uncertainty is removed and the interferometer is rendered less sensitive to fluctuations in the beat frequency.

Another featured embodiment includes a digital clock to measure the proportionate length of the set mode. The digital clock provides a faster and more accurate averaging of the output of the bistable element and in addition provides a digital interferometer output that can be conveniently processed by conventional computer techniques.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
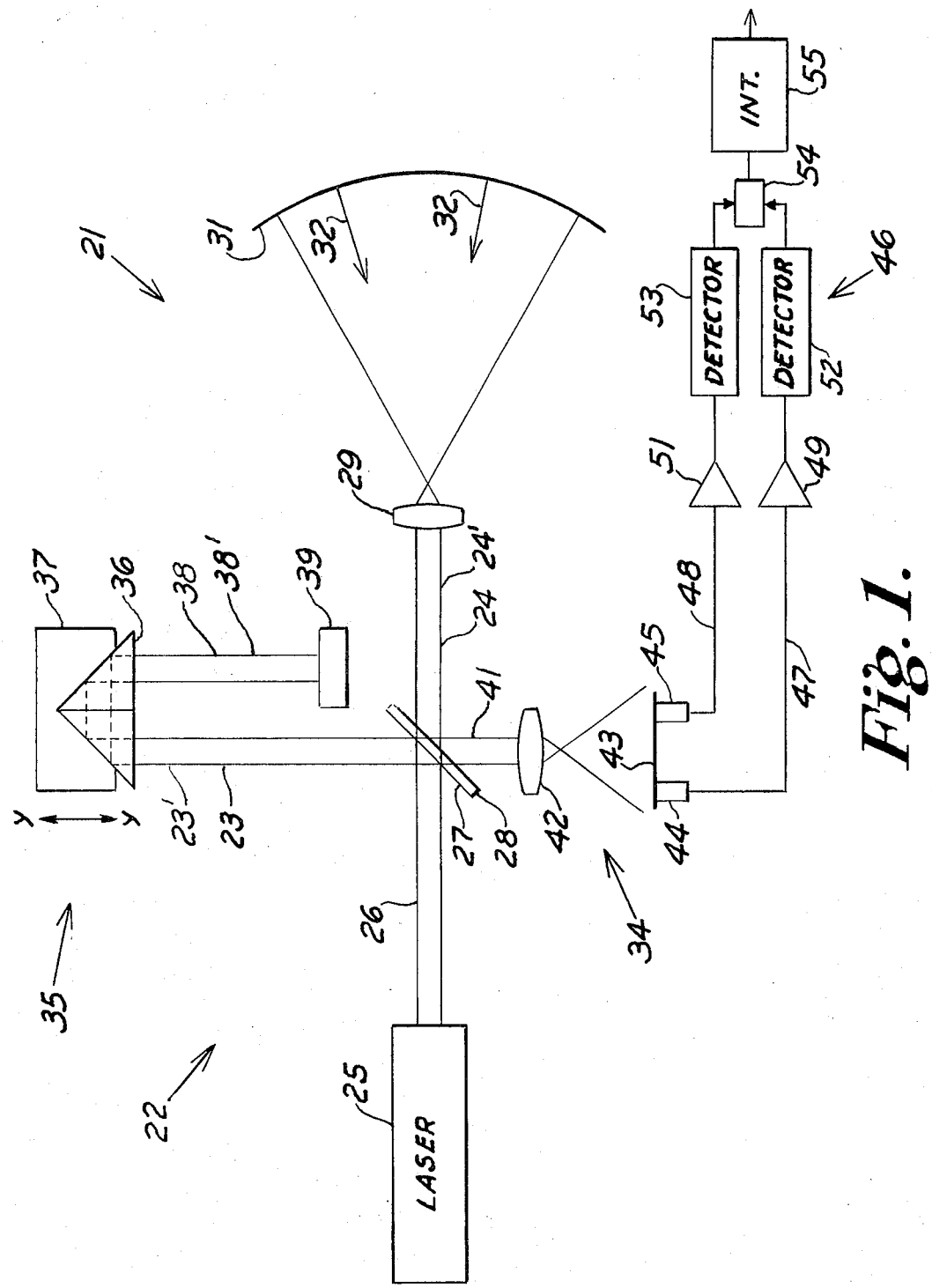
FIG. 1 shows a diagram of a preferred embodiment of the invention that utilizes a Doppler frequency shift techniques.

Referring first to FIG. 1 there is shown in interferometer 21 including a radiation source 22 that produces a reference beam 23 and a test beam 24. A laser 25 within the source 22 produces a primary light beam 26 that strikes a partially reflective face 27 of an optical beam splitter 28. The beam splitter face 27 divides the primary beam 26 into the reference beam 23 and test beam 24. The optical test plate 28 directs the test beam 24 toward a test diverger 29 that expands the test beam so as to evenly illuminate a surface 31 that is to be tested. Returning rays 32 reflected from the curved test surface 31 are collimated by the test diverger 29 to from a returning test beam 24' and follow the path of the test beam 24 until they impinge on a partially reflective face 27 of the beam splitter plate 28. The beam 24' is directed downward by the combining face 27 toward a detection assembly 34 as shown in FIG. 1.

The reference beam 23 is reflected upwards as shown in FIG. 1 by the beam splitting surface 27 and enters a Doppler apparatus 35. In the Doppler apparatus 35 the reference beam 23 first impinges on a translating corner cube 36 in a retroreflector assembly 37. Operation of the retroreflector assembly 37 is explained more fully below with reference to FIGS. 2 and 3. Since the retroreflector 37 reciprocates with motion along the axis $y-y$, that is parallel to the beam 23, a beam 38 emerging from the corner cube 36 exhibits a Doppler frequency shift. Due to the retroreflective characteristics of the corner cube 36, the shifted beam 38 is parallel to the reference beam 23. A stationary return mirror 39 is disposed in the path of the beam 38, and is perpendicular thereto. Therefore, a returning shifted beam 38' follows the same path as the input beam 38. Again, as a result of the retroreflective effect produced by the corner cube 36, and as explained more fully below, a Doppler shifted reference beam 23' is parallel to the beam 38', and therefore is parallel to and superimposed on the reference beam 23.

The Doppler shifted reference beam 23' passes through the beam splitter plate 28 and combines with the returning test beam 24' to form an output beam 41 that enters the detection apparatus 34. An output imaging lens 42 within the detection apparatus 34 expands the output beam 41 to project an image of the test surface 31 on an image surface 43. Optical interference phenomena produce interference patterns on the image surface 43, reference beam 23 and the test beam 24 were originally of the same frequency, but a Doppler shift was imposed on the test beam. Represented in those 41 resulting a beat frequency component in the output beam $- RESULTING from the Doppler frequency shift introduced into the return reference beam 23'. This beat frequency causes the inteference patterns to oscillate or travel rather than remain stationary. Two photosensitive detectors 44 and 45 respond to the moving interference pattern producing output signals at the beat frequency. The detectors 44 and 45 are movable on the image surface 43 and are operatively coupled to a detection circuit 46 by two lines 47 and 48. Two bandpass amplifiers 49 and 51 receive the signals from the sensors 44 and 45 and, after amplification, pass the signals to two capacitively coupled crossover detectors 52 and 53. A flip flop 54 is responsive to the outputs of the detectors 52 and 53 and is set and reset thereby. An output of the flip flop, or bistable element, operating between ground and a fixed voltage is averaged in an integrator 55.

Figure 2:
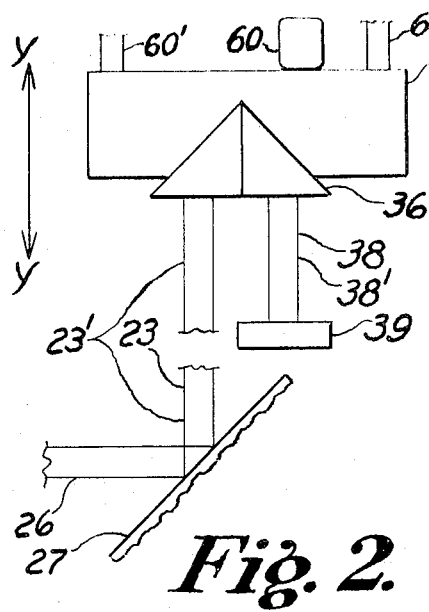
FIG. 2 shows a detailed diagram of a moving retroreflector utilized in FIG. 1.
Figure 3:
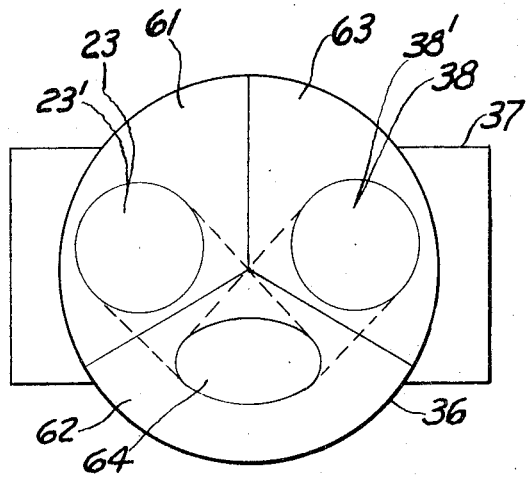
FIG. 3 shows a detailed plan view of a corner cube reflector used in the retroreflector shown in FIG. 2.

Referring next to FIGS. 2 and 3 is shown a detail of the Doppler shift apparatus 35 and the corner cube element 36 that are used in the embodiment 21. Upon deflection by the beam splitting surface 27, the reference beam 23 is directed to the corner cube 36. As is seen from below in FIG. 3, the corner cube 36 includes three reflective surfaces 61, 62 and 63 that are at right angles to one another. When the reference beam 23 strikes the first reflective surface 61 as shown in FIG. 3, it is deflected toward the second reflective surface 62 and impinges thereon in an eliptical area 64. The beam is then deflected by the reflective surface 62 toward the third reflective surface 63 and is reflected therefrom as the beam 38 and is precisely parallel to the beam 23 as shown in FIGS. 2 and 3. After the beam 38 is reflected by the stationary mirror 39 forming the beam 38' as shown in FIG. 2, it traverses the path just described, but in the opposite direction. Beams passing in and out of the corner cube 36 remain parallel even if the orientation of the corner cube is changed slightly. Therefore, minor orientation changes that occur as the reciprocating retroreflector 37 translates do not affect the parallel and superimposed relationship between the beams 23 and 38. In addition, since the beams 38' and 23' are parallel, the exact position at which the beam 23' strikes the beam splitting surface 27 is determined by the reflective mirror 39 which is stationary. Thus, since the paths of the various beams 23, 23', 38 and 38', are determined by stationary components, the path orientations remain fixed as the retroreflector 37 reciprocates to provide the Doppler shift. A motor 60 drives the retroreflector 37 along two guides 61' in the reciprocating motion. The guide 61' are sufficiently long that meaningful measurements can be taken during each unidirectional stroke.

During operation of the embodiment 21 shown in FIGS. 1, 2 and 3 the laser 25 produces the primary beam 26 that is divided to form the reference beam 23 and test beam 24. The test beam 24 passes through the diverger 29 and is reflected by the test surface 31. Convergence of the reflected rays 32 in the diverger 29 forms the reflected test beam 24'. The combining surface 27 on the optical test plate 28 reflects the beam 24' through the output imaging diverger 42 and focuses an image of the test surface 31 on the image surface 43. Simultaneously, the reference beam 23 is deflected to the Doppler apparatus 35 and a Doppler shift is imposed on the beam. The returning Doppler shifted test beam 23' passes through the optical test plate 28 to the output imaging diverger 42 and is expanded to illuminate the image surface 43. A uniform field covering the test surface 43 appears as a result of beam interference phenomena. Because the reference beam 23 has been shifted in frequency, the phase relationship between the shifted reference beam 23' and the returning test beam 24' does not remain constant. That is to say the uniform field on the image surface 43 cycles from light to dark to light according to the difference beat frequency of the output beam 41. The exact phase relationship between the shifted reference beam 23' and the reflected test beam 24' at any particular instant is dependent upon the frequency shift produced by the Doppler apparatus 35 and the path length traversed by each of the beams. Any aberration or geometric deviation of the test surface from a desired perfect surface, defined to be tangent to the test surface at the point viewed by the image of the reference detector, alters the path lenght of a portion of the reflected test beam 24'. Such an aberration or change in path length, will therefore cause an aberration to appear in the interference pattern. That is, a small patch that corresponds geometrically to the aberration on the test surface 31 will appear lighter or darker than the surrounding field on the image surface 43. The path will also vary from light to dark at the beat frequency, but these intensity variations will be at a constant phase difference compared to the rest of the field, that phase difference being dependent upon the magnitude of the aberration on the surface 31.

The phase difference is detected and analyzed as follows. One of the photosensitive detectors 44 is stationary and is used to provide a reference signal, and the other photodetector 45 is moved so as to scan the image surface 23. The position of the scanning detector 45 can be computer controlled to facilitate computer data reduction. If the reflective test surface 31 were perfect, the phase angle of the output of the detectors 44 and 45 would remain identical during the entire scanning process. However, any aberrations present cause a temporary phase difference between the detector outputs when the detector 45 scans the aberration. That phase difference is directly proportional to the size of the aberration as compared to the wavelength of the test beam 24. The outputs of the detectors 44 and 45 are passed to the phase detector circuit 46 by the lines 47 and 48. Initially, the beat frequency signals are selected and amplified by the bandpass amplifiers 49 and 51 and then the positive going crossovers are identified by the detectors 52 and 53. Each positive going crossover identified by the detector 52 acts as a reference and sets the bistable device 54 so that the output is a fixed voltage and each positive going crossover identified by the detector 53 resets the bistable device so that its' output is at ground. The output of the bistable device 54 is averaged by the integrator 55 to provide a proportional indication of the periods of the set and reset modes and consequently a proportional representation of the phase angle difference as compared to one full cycle of the beat frequency. Several readings are taken with the test detector 45 in one location, and the information obtained therefrom is placed in a computer memory then the test detector is moved to a new location. This procedure is repeated until the entire image surface 43 is scanned.

Figure 4:
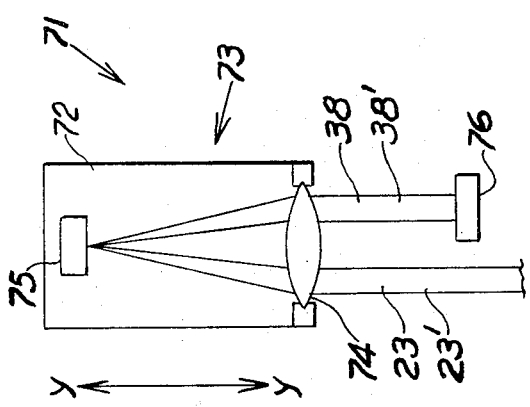
FIG. 4 shows an alternate retroreflector comprising a cat's eye that can be utilized in an embodiment such as that shown in FIG. 1.

Referring next to FIG. 4 there is shown an alternate Doppler apparatus 71 comprising a translating retroreflector 72 that includes a cat's eye element 73. The translating retroreflector 72 reciprocates along the axis $y-y$ as did the translating retroreflector 37. Following reflection from the mirror 75, the beam is collimated by the lens 74, forming the beam 38 that impinges on a stationary mirror 76 similar to that stationary mirror 39 shown in FIG. 2. The beam 38' is reflected from the mirror 76 and passes through the lens 74 to the mirror 75. After reflection from the mirror 75 the beam 23' is collimated by the lens 74 and retraces the path of the beam 23. The cat's eye 73 functions similarly to the corner cube 76 in that beams passing therethrough remain parallel and are insensitive to minor orientation changes of the cat's eye. Therefore, operation of the Doppler apparatus 71 is similar to the operation of Doppler apparatus 35 as explained above in FIG. 2 and the Doppler apparatus 71 and may be substituted therefor without further changes in the system shown in FIG. 1.

Figure 5:
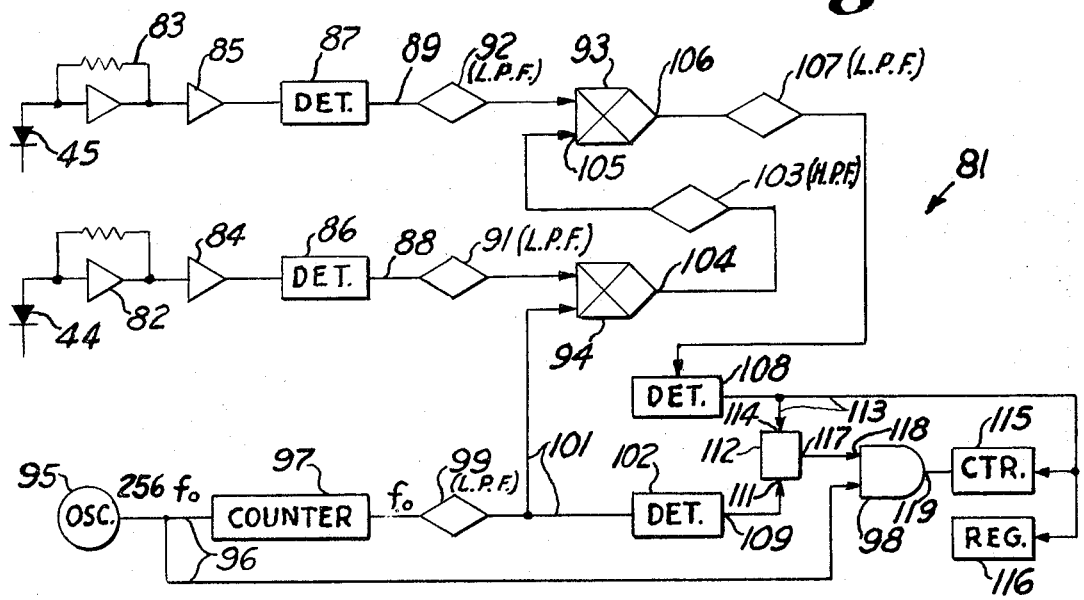
FIG. 5 shows an alternate embodiment of the detection circuit shown in FIG. 1.

Referring next to FIG. 5 there is shown an alternate detection circuit 81. The photosensitive detectors 44 and 45 are connected to preamplifiers 82 and 83 respectively, and then to bandpass amplifiers 84 and 85, respectively. Two Schmidt trigger detectors 86 and 87 receive the outputs from the bandpass filters 84 and 85 and produce a square wave output of a constant absolute value and of polarities matching the input signal received from the bandpass amplifiers. Two lines 88 and 89 carry the square waves to low pass filters 91 and 92, respecrively, producing thereby pure sine waves of constant amplitude. A multiplier 93 receives the output of filter 92 and another multiplier 94 receives the output of the filter 91. A stable local oscillator 95 produces a signal at a frequency approximately 256 times the typical beat frequency sensed by the detectors 44 and 45. The beat frequency is approximately 10 $KH_z$, therefore the oscillator 95 produces a 2.56 $MH_z$ signal. Part of the output of the oscillator 95 is fed to an eight bit counter 97 by a line 96 and the remainder is carried to an AND gate 98. A low pass filter 99 receives the output of the counter 97 and a line 101 splits the output of the filter 9, carrying one half thereof to a capactively coupled zero crossing detector 102 and the remaining signal to a second input of the multiplier 94. A high pass filter 103 connects an output 104 of the amplifier 94 to a second output 105 of the multiplier 93. An output 106 of the multiplier 93 is passed by a lowpass filter 107 to a capacitively coupled zero crossing detector 108 similar to the detector 102. An output 109 of the detector 102 is fed to a reset terminal 111 of a bistable f.f. 112. After dividing the otuput from the detector 108 a line 113 carries part thereof to a set terminal 114 of the bistable element (flip flop) 112 and the remaining signal to a counter 115 and a register 116. An output 117 of the multivibrator 112 is fed to a second input 118 of the AND gate 98 and an output 119 of the AND gate 98 is connected to the counter 115.

The circuit 81 can be substituted directly for the circuit 46 shown in FIG. 1 and operates as follows. If the beat frequency is $f_b$, the signal sensed by the detector 44 is cos $(2\pi f_b t + \phi_1)$ and that signal is amplified by the preamplifier 82 and passed to the bandpass amplifier 84 where harmonics are eliminated and further amplification is performed. The wave is converted to a square wave of the same frequency, with the phase angle $\phi_1$ by the threshold detector 86 as described previously. The low pass filter 91 receives the square wave on the line 88 and eliminates all but the lowest frequency component thereof, thereby transforming the square wave to a sine wave of normalized amplitude that is controlled by the output amplitude of the threshold detector 86. Similar operations are performed on a signal cos $(2\pi f_b t + \phi_2)$ as sensed by the detector 45 and a corresponding normalized sine wave is available from the lowpass filter 92. The sine waves are fed to one of the respective multipliers 93 or 94. Some phase shifts may occur in the circuit comprised of the preamplifier 82, bandpass amplifier 84, Schmidt trigger 86 and a lowpass filter 91, however these are not important since such changes are impressed equally on the outputs of both detectors 44 and 45 and only relative phase difference is of interest. The frequency output of the local oscillator 95 is reduced by the counter 96 to 1/256 of the generated frequency, and thereby becomes a square wave of approximately 10$KH_z$ and is denoted $f_0$. Operation of the lowpass filter 99 on this square wave again produces a sine wave of the normalized amplitude. Multiplication of cos $(2\pi f_0 t)$ and cos $(2\pi f_b t + \phi_1)$ in the muliplier 94 yields a signal cos $((2\pi f_0 t) \pm (2\pi f_b t + \phi_1))$ and the high pass filter 103 eliminates the minus term, thereby yielding cos $(2\pi f_0 t + 2\pi f_b t + \phi_1)$ which is fed to the input 105 of the multiplier 93. At the output 106 of the multiplier 93 is the signal cos $(2\pi f_0 t + 2\pi f_b t + \phi_1 \pm (2\pi f_b t + \phi_2))$ and the lowpass filter 107 removes the plus term yielding cos $(2\pi f_0 t + \phi_1 - \phi_2)$. The resultant signal that is fed to the detector 108 does not contain the beat frequency $f_b$, but rather the stable carrier frequency $f_0$, yet maintains the relative phase angle. Consequently, the flip flop 112 is set by crossovers of cos $(2\pi f_0 t + \phi_1 - \phi_2)$ and rest by crossovers of cos $2\pi f_0 t$ so that during a cycle of length $2\pi$, the signal at the output 117 is on for $\phi_1 - \phi_2$ and the AND gate 98 is enabled $\phi_1 - \phi_2/2$ of each cycle. Since during each cyle of the flip flop 112 the AND gate 98 receives 256 pulses on the line 96, $(\phi_1 - \phi_2/2) = N/256$, where $N$ is the count registered in the counter 115 at the end of a cycle. Therefore, $\phi_1 - \phi_2$ can easily be computed. In addition, each pulse on the line 113 clears the counter, and transfers the count therein to the register 116. Separate counts are taken at various locations until scanning is completed.

Figure 6:
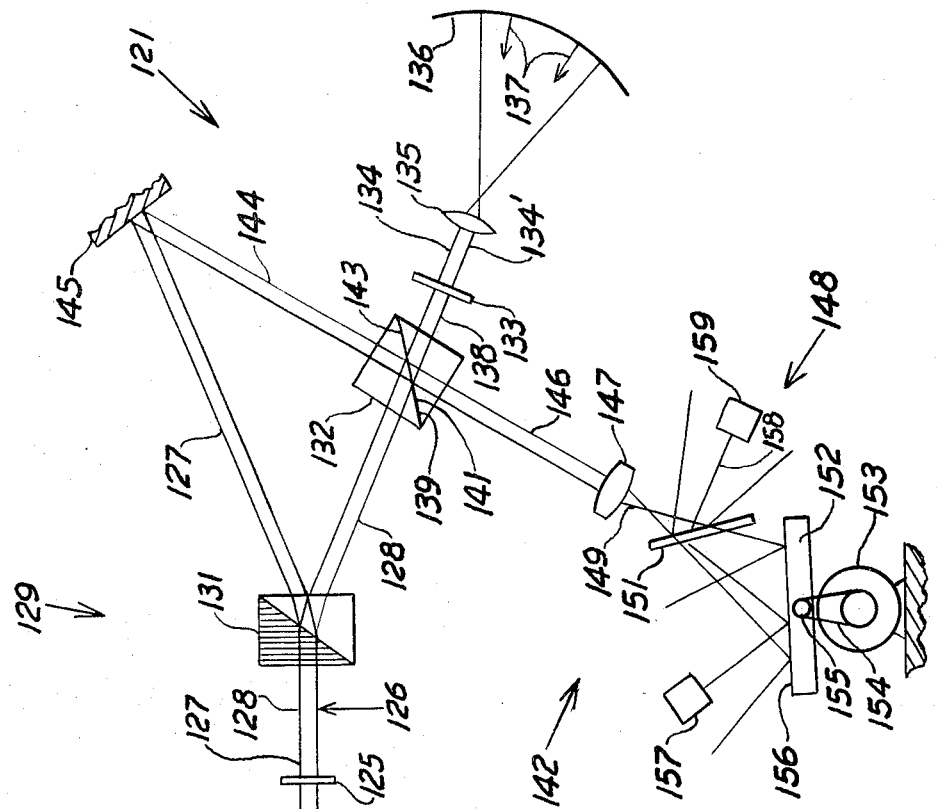
FIG. 6 shows an alternate embodiment of an interferometer utilizing a Zeemen effect laser.

Referring now to FIG. 6 there is another preferred interferometer 121 that includes a laser 122 as a radiant energy source. A strong magnetic field (not shown) imposed axially on the laser cavity 122 gives rise to the Zeeman effect, causing the laser to emit a primary beam 124 composed of oppositely circularly polarized light of two different wave lengths that impinges on a quarter wave plate 125. Emerging from the quarter wave plate 125 is an intermediate beam 126 that is comprised of two separate orthogonally polarized beams 127 and 128 of different wave lengths. The beam 127, denoted the reference beam 127, is s polarized and the beam 128, denoted the test beam 128, is p polarized. An optical test apparatus 129 including a Wollaston prism 131 refracts the s polarized reference beam 127 upward and the p polarized test beam 128 downward as shown in FIG. 6. After passing through a combining prism 132, the p polarized test beam 128 impinges on another quarter wave plate 133. An intermediate test beam 134 emerging from the quarter wave plate 133 is expanded by a test diverger 135 to illuminate a shaped surface 136 that is to be tested. Rays 137 reflected from the test surface 136 are collimated by the test diverger 135 to form a reflected intermediate test beam 134' that impinges on the quarter wave plate 133. Upon emerging on the second pass through the quarter wave plate 133 the reflected test beam 134' has been rotated to form an s polarized test beam 138. A reflective surface 139 within the combining prism 132 reflects s polarized waves impinging a reflective side 141 thereof and so reflects the s polarized test beam 138 toward a detection apparatus 142. A stationary mirror 145 reflects the reference beam 127 toward the prism 132 as a beam 144. S polarized waves are passed by a non-reflective side 143 of the reflective surface 139 and therefore the reflected reference beam 144 is passed to the output apparatus 142. Combination of the s polarized test beam 138 and the s polarized reference beam 144 forms an output beam 146. An output diverger lens 147 in an imaging apparatus 148 expands the output beam 146. Most of the radiation in an expanding output beam 149 passes through a partially silvered mirror 151 to a rotatably mounted mirror 152. A motor 153 drives the mirror in reciprocal motion about an axis 155 with a belt 154. An image of the test surface 136 is projected on an image surface 156 of the mirror 152 and light emanating from different portions of the surface 136 is projected to a photosensitive detector 157 as the mirror 152 reciprocates. Consequently, the test surface 136 is one dimensionally scanned as the mirror 152 reciprocates, and the detector 157 is slowly displaced in a direction perpendicular to the paper as shown in FIG. 6 thereby making the scan two dimensional. A ray 158 reflected by the mirror 151 impinges on a stationary reference photodetector 159 as shown in FIG. 6. This embodiment 121 can be used with either the detection circuit 46 shown in FIG. 1 or the detection circuit 81 in FIG. 5.

During operation of the embodiment 121 the laser emits the beam 124 that is converted into the beams 127 and 128 by the quarter wave plate 125. The reference beam 127 is deflected by the prism 131 to the mirror 145 and the beam 144 is directed to the surface 139. Simultaneously, the beam 128 is reflected by the test surface 136 to form the beam 138 that is reflected by the reflective surface 141, combining with the beam 144 to form the output beam 146. Interference phenomena occurs in the beam 146, and a beat frequency is present that corresponds to the difference in frequency between the beams 127 and 128. An interference pattern caused by the interference phenomena is projected on the surface 156 and that interference pattern is scanned as the mirror 152 reciprocates in steps and the detector 157 translates in steps. Simultaneously, the detector 159 continuously samples the ray 158 emanating from a fixed point on the test surface 136 thereby providing a reference signal. Outputs from the detectors 157 and 159 are passed to either of the detection circuits 81 or 46 and analyzed as described with respect thereto.

Obviously, many modifications and variations of the present invention are possible in light of the above teachings. It is to be understood, therefore, that the invention can be practiced otherwise than as specifically described.

What is claimed is:

1. Interferometer apparatus comprising:
   a. radiation source means for producing a test beam and a reference beam, said test and reference beams being coherent monochromatic beams of substantially the same wavelength;
   b. optical test means for directing said test beam toward a reflective test surface and comprising a test diverger means in the path of said test beam for expanding said test beam so as to illuminate a shaped test surface and wherein said test diverger means also collimates returning reflections from said shaped test surface;
   c. Doppler means for introducing a Doppler frequency shift between said test and reference beams;
   d. optical combining means for combining said Doppler shifted test and reference beams into an output beam after reflection of said test beam from the test surface; and
   e. detection means responsive to a beat frequency of said output beam and comprising an output imaging means and an image surface means disposed in the path of said output beam so as to produce interference phenomena on said image surface means, further comprising a plurality of photo-sensitive detectors disposed in different positions on said image surface, said detectors being movable with respect to each other and being for detecting the intensity of said interference phenomena at said different positions by receiving radiation reflected from different locations on said test surface and wherein said detection means further comprises detection circuit means operatively coupled to said plurality of detectors to determine phase relationships among the outputs of said plurality of detectors.

2. Inteferometer apparatus according to claim 1 wherein said radiation source means comprises a radiation source for producing a primary beam and beam splitter means for dividing said primary beam to form said test and reference beams.

3. Interferometer apparatus according to claim 2 wherein said light source comprises a laser.

4. Interferometer apparatus according to claim 1 wherein said Doppler means comprises a retroreflector means for introducing said Doppler shift between said test and reference beams.

5. Interferometer apparatus according to claim 4 wherein said retroreflector means comprises a retroreflector element, a mirror disposed to reflect toward said retroreflector element wave energy received therefrom, and motive means for producing relative movement therebetween.

6. Interferometer apparatus according to claim 5 wherein said mirror is fixed and said motive means produces reciprocating movement of said retroreflector element.

7. Interferometer apparatus according to claim 6 wherein said reciprocating retroreflector element comprises a cat's eye.

8. Interferometer apparatus according to claim 6 wherein said reciprocating retroreflector element comprises a translating corner cube.

9. Interferometer apparatus according to claim 1 wherein said detection circuit means comprises two capacitively coupled zero crossing detectors, each one operatively associated with one of said photosensitive detectors and responsive thereto, and said detection circuit means further comprises a bistable device that is operatively coupled to said threshold detectors and is set and reset by signals therefrom.

10. Interferometer apparatus according to claim 9 wherein said detection circuit means further comprises a heterodyne circuit for replacing the beat frequency in the output of said two photosensitive detectors with a stable carrier frequency before actuation of said bistable device.

11. Interferometer apparatus according to claim 10 wherein said detection circuit means further comprises a clock means for measuring the proportional periods of the set and reset modes.

12. Apparatus according to claim 1 wherein each of said photosensitive detectors comprises photo diode means responsive only to the difference beat frequency in said output beam.

13. Interferometer apparatus comprising:
a. a radiation source means for producing a test beam and a reference beam, wherein both of said beams are monochromatic and coherent and are of different wavelengths;
b. optical test means for directing said test beam toward a reflective test surface;
c. optical combining means for directing said beams such that said beams combine after said test beam has been reflected by said test surface to form an output beam; and
d. detection means responsive to a beat frequency in said output beam and comprising:
A. an imaging means with an image surface means disposed in the path of said output beam so as to produce interference phenomena on said image surface means;
B. two photosensitive detectors disposed in different positions on said image surface and movable with respect to each other and receiving radiation reflected from different locations on said test surface so as to be responsive to the intensity of said interference phenomena at said positions and
C. detection circuit means that comprises:
i. two capacitively coupled zero crossing detectors, each one operatively associated with one of said two photosensitive detectors and responsive thereto; and
ii. a bistable device that is operatively coupled to said zero crossing detectors and is set and reset by signals therefrom.

14. Interferometer apparatus according to claim 13 wherein said radiation source means comprises a laser subjected to a magnetic field.

15. Interferometer apparatus according to claim 14 wherein said detection circuit means further comprises a clock means for measuring the proportional periods of the set and reset modes.

16. Interferometer apparatus according to claim 13 wherein said optical test means comprises a test diverger means for expanding said test beam so as to illuminate a shaped test surface and wherein said test diverger means also collimates returning reflections from said shaped test surface.

17. Interferometer apparatus according to claim 16 wherein said detection circuit means further comprises a heterodyne circuit for replacing the beat frequency in the output of said two photosensitive detectors with a stable carrier frequency before actuation of said bistable device.

* * * * *